(12) United States Patent
Bahler

(10) Patent No.: US 7,997,633 B2
(45) Date of Patent: Aug. 16, 2011

(54) LIFTER TOOL

(76) Inventor: Philip J. Bahler, Tolland, CT (US)

( * ) Notice: Subject to any disclaimer, the term of this patent is extended or adjusted under 35 U.S.C. 154(b) by 415 days.

(21) Appl. No.: 12/286,611

(22) Filed: Oct. 1, 2008

(65) Prior Publication Data

US 2009/0096228 A1   Apr. 16, 2009

Related U.S. Application Data

(60) Provisional application No. 60/999,305, filed on Oct. 16, 2007.

(51) Int. Cl.
*B65G 7/12* (2006.01)
(52) U.S. Cl. .................. 294/62; 269/3; 269/6; 269/228
(58) Field of Classification Search .............. 294/62, 294/63.1, 101, 67.22, 15; 269/3, 6, 228
See application file for complete search history.

(56) References Cited

U.S. PATENT DOCUMENTS

| 370,565 | A |  | 9/1887 | Soule |  |
|---|---|---|---|---|---|
| 828,576 | A |  | 8/1906 | Shaffrank |  |
| 2,374,120 | A |  | 4/1945 | Mueller et al |  |
| 2,708,592 | A |  | 5/1955 | Dalkranian |  |
| 3,129,029 | A |  | 4/1964 | Ruzza |  |
| 3,604,745 | A |  | 9/1971 | Sinclair |  |
| 4,097,084 | A | * | 6/1978 | Russell | 294/104 |
| 5,039,150 | A |  | 8/1991 | Jones et al |  |
| 5,820,180 | A |  | 10/1998 | Haupt |  |
| 5,826,927 | A |  | 10/1998 | Long |  |
| 6,116,588 | A | * | 9/2000 | Yamane | 269/228 |
| 6,530,566 | B1 | * | 3/2003 | DuVernay | 269/228 |
| 6,932,335 | B1 | * | 8/2005 | Dykstra | 269/228 |
| 7,163,246 | B2 |  | 1/2007 | Anzaldua |  |
| 7,234,742 | B2 |  | 6/2007 | VanHecker |  |
| D547,152 | S |  | 7/2007 | Anzaldua |  |
| 7,370,398 | B2 | * | 5/2008 | Gosis et al. | 29/407.01 |
| 7,648,131 | B2 | * | 1/2010 | Hagan et al. | 269/228 |

* cited by examiner

*Primary Examiner* — Saúl J Rodríguez
*Assistant Examiner* — Stephen Vu
(74) *Attorney, Agent, or Firm* — Ira S. Dorman

(57) ABSTRACT

Elevating a handle of the lifter tool creates a clamping force between a bottom support plate and a top clamping plate operatively attached to the handle, allowing a worker to transfer, simultaneously, a number of stacked pavers, or similar block-like objects, quickly, efficiently and safely. A push-off plate facilitates unloading of the pavers from the tool.

7 Claims, 5 Drawing Sheets

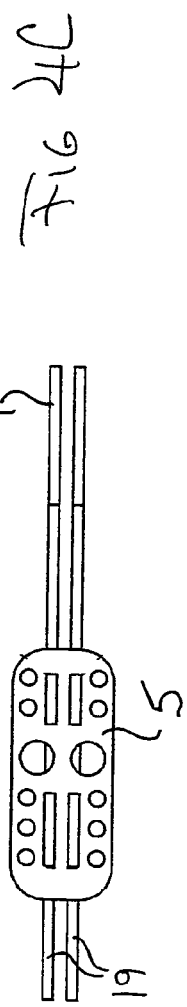
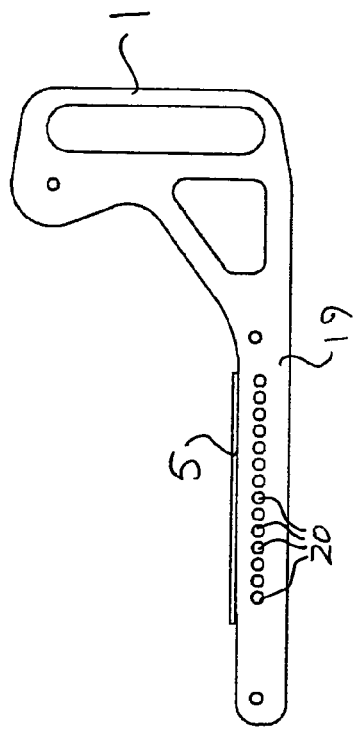
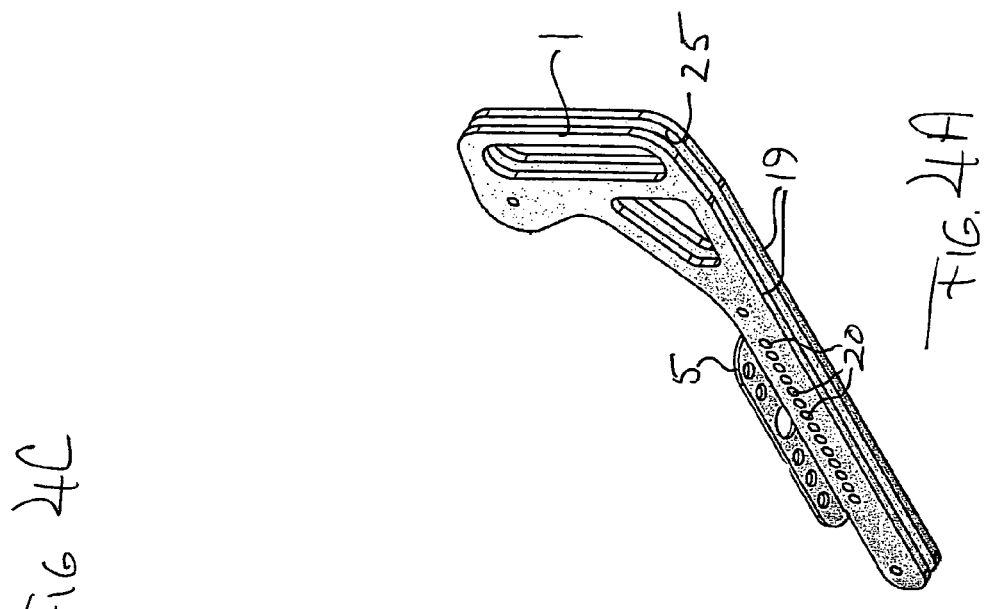
FIG. 4A
FIG. 4B
FIG. 4C

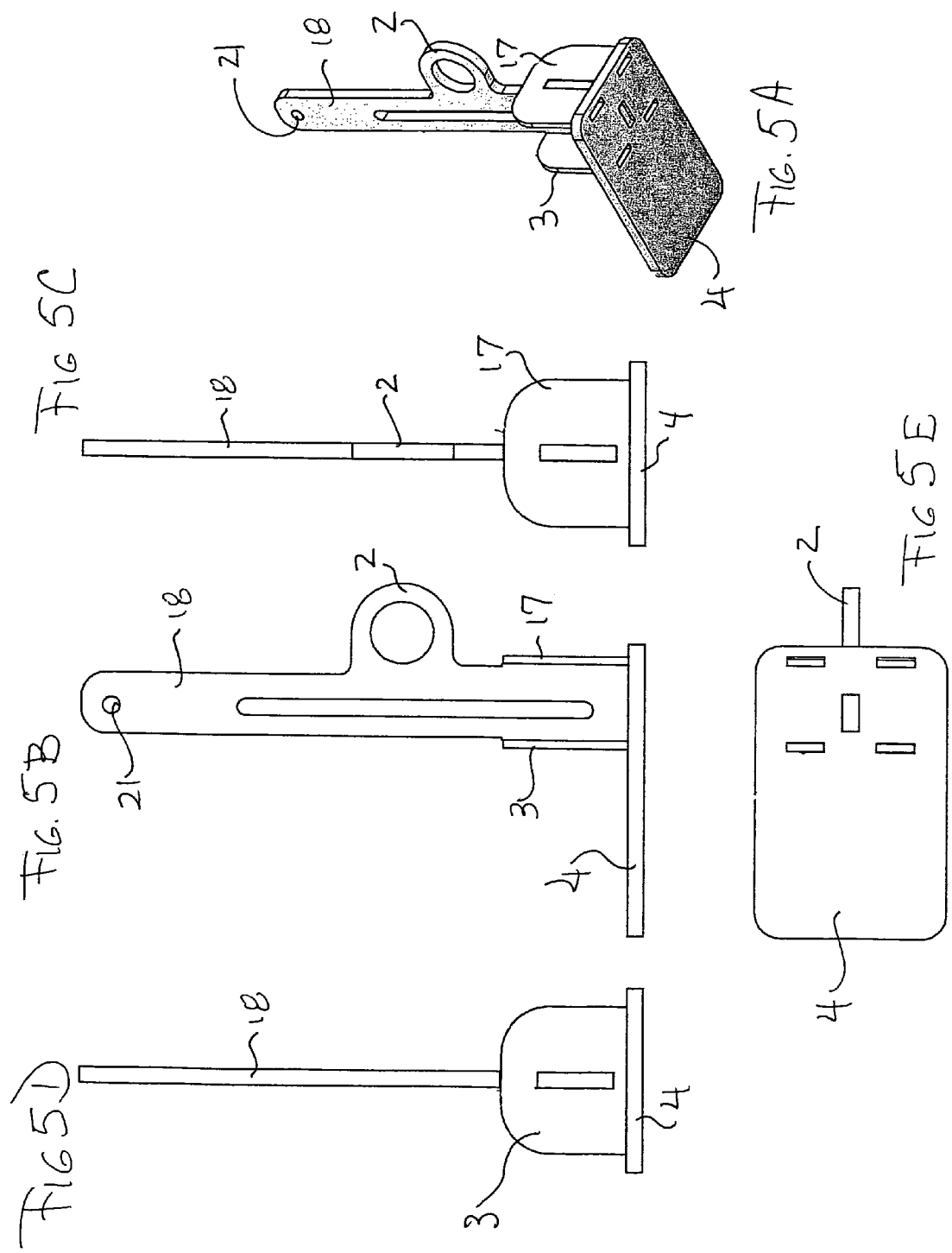

LIFTER TOOL

CROSS REFERENCE TO RELATED APPLICATION

This application claims the benefit of U.S. Provisional Patent Application No. 60/999,305, filed Oct. 16, 2007, the entire specification of which is incorporated hereinto by reference thereto.

BACKGROUND OF THE INVENTION

A need exists for a tool that allows a user to simultaneously move stacks of pavers, or similar block-like objects, from place-to-place, and to do so quickly, efficiently, and safely.

SUMMARY OF THE INVENTION

The broad object of the present invention is to provide a tool that satisfies the foregoing need. Additional objects are to provide such a tool that saves work; that enables the user to transport an increased number of blocks, or to move blocks with less effort than would otherwise be required; that decreases the amount of bending by the user than would otherwise be necessary, thereby reducing physical stress and, in particular, back strain; and that protects the user's hands and fingers, thus eliminating the need for wearing gloves while transporting blocks.

It has now been found that the foregoing and related objects of the invention are attained by the provision of a lifting tool comprising a support member, a carrier assembly, disengageable fastening means, a handle member, a clamping member, at least one link element, and means for pivotably attaching the several components to one another. Normally, the main functional components of the tool will be fabricated from steel.

In a preferred, specific embodiment, the support member includes a generally planar support plate and a post attached to the plate; the post extends upwardly from the plate, in the disposition of normal use of the tool, and a portion of the support plate extends forwardly of the post. The carrier assembly is comprised of a pair of substantially identical flat frame, or bracket, pieces affixed to one another in parallel, transversely spaced relationship so as to present a common profile, each of the frame pieces having an elongate, generally rectilinear upstanding leg section and a forwardly offset shoulder section at the upper end of the leg section. The leg sections of the frame pieces cooperatively define a channel in which the post of the support member is received, to slidably mount the carrier assembly on the support member, and a multiplicity of pairs of transversely aligned apertures are provided at spaced locations along the lengths of the legs. An element of the disengageable fastening means extends through an aperture in the upper portion of the post and through one of the pairs of apertures through the leg sections of the frame pieces so as to affix the carrier assembly at a selected height on the support member. The shoulder sections of the frame pieces have at least one pair of transversely aligned apertures at a location spaced forwardly of the longitudinal axes of the leg sections, and they also have a pair of transversely aligned, laterally elongated openings in upper parts thereof to cooperatively provide a hand-grip portion on the carrier assembly.

The handle member of the tool has a head section at one end, from which a handle section extends, and a portion of the head section is received in the space between the shoulder sections of the frame pieces with the handle section extending forwardly thereof. One aperture of the head section, proximate the handle section, is aligned with a transversely aligned pair of apertures through the shoulder sections of the frame pieces to cooperatively define a handle member mounting passage in which a first pivot element is disposed, thereby rotatably mount the handle member on the frame pieces with a bottom portion of the head section accessible for mechanical connection.

The clamping member includes a clamping plate, to which a pair of parallel pivot arms are attached. Rearward portions of the pivot arms project beyond the edge of the clamping plate and have apertures therethrough that are aligned with apertures in the leg sections of the frame pieces so as to define a pivot arm mounting passage. A pair of substantially identical link elements are disposed in parallel, transversely spaced relationship so as to present a common profile. A first pair of apertures, at one of the ends of the link elements, is aligned with the aperture in the bottom portion of the handle member head section to cooperatively define a link element mounting passage, and a second pair of apertures, at the other end of the link elements, is aligned with apertures in the pivot arms to cooperatively define a clamping member mounting passage. Pivot elements are disposed in the pivot arm mounting passage, the link element mounting passage, and the clamping member mounting passage so as to enable movement of the clamping plate, toward and away from the support plate, in opposition to pivotal movement of the handle section of the handle member in upward and downward directions, respectively. A push-off plate has marginal portions that contact the blocks when the carrier is rotated about its vertical axis, to promote and facilitate unloading.

BRIEF DESCRIPTION OF THE DRAWINGS

FIGS. 4A, 4B and 4C are, respectively, perspective, side elevational, and front views of the top frame subassembly used in the tool; and FIGS. 5A, 5B, 5C, and 5D, and 5E are, respectively, perspective, side elevational, rear, front, and bottom views of the bottom frame subassembly used in the tool.

DETAILED DESCRIPTION OF THE PREFERRED AND ILLUSTRATED EMBODIMENT

Figure 1A:
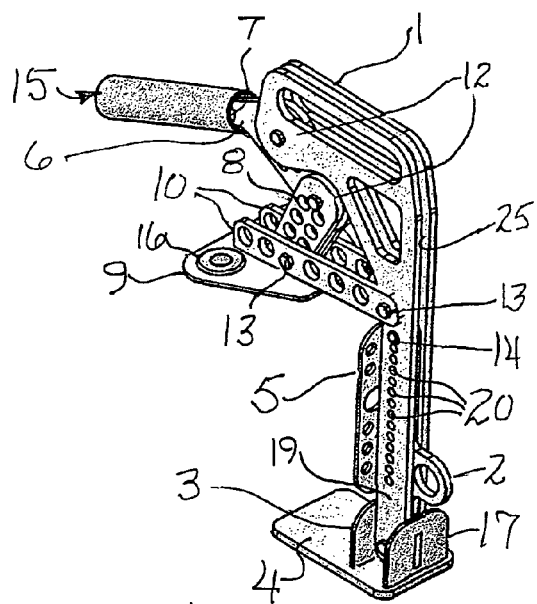
FIGS. 1A, 1B, 1C and 1D of the drawings are, respectively, perspective, side elevational, top, and rear views of a lifter tool embodying the present invention, FIG. 1B showing, in phantom line, a stack of four loaded pavers "P" prior to being clamped within the tool.
Figure 1C:
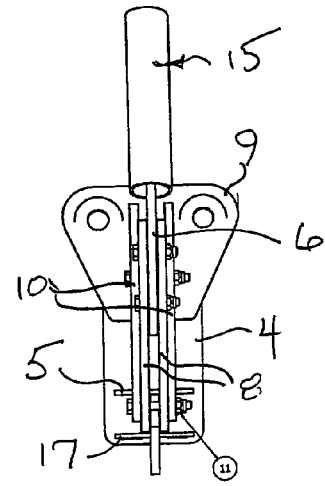
Figure 1B:
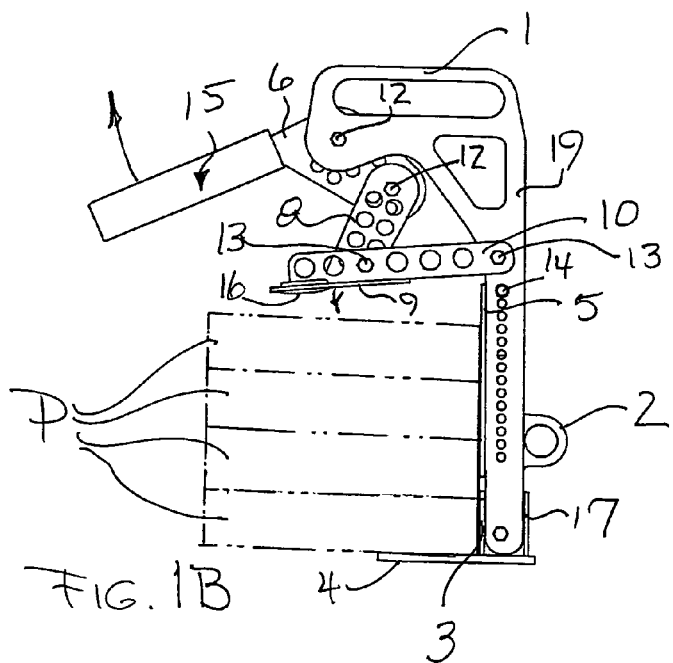
Figure 1D:
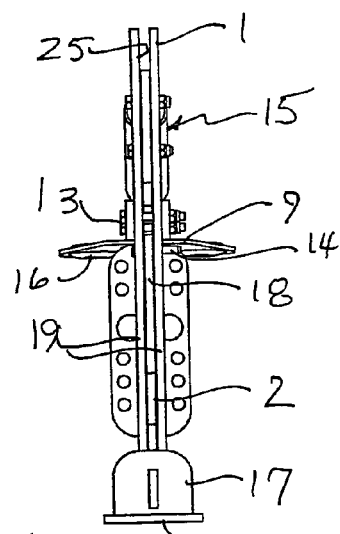
Figure 2B:
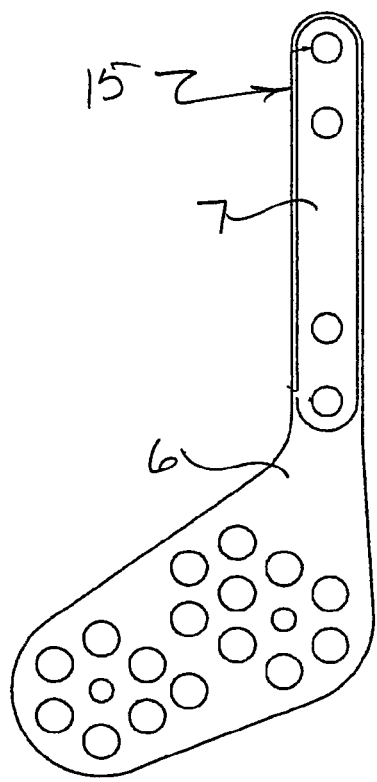
FIGS. 2A, 2B and 2C are, respectively, perspective, side elevational, and top views of the clamping handle subassembly used in the tool of FIG. 1.
Figure 2C:
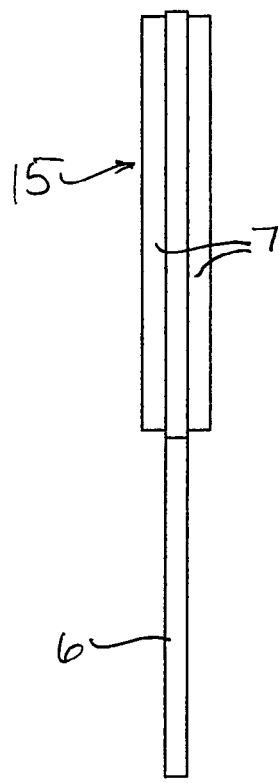
Figure 2A:
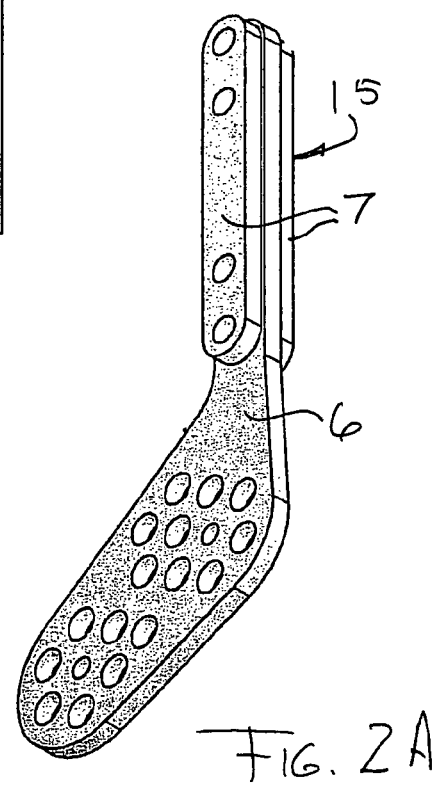
Figure 3A:
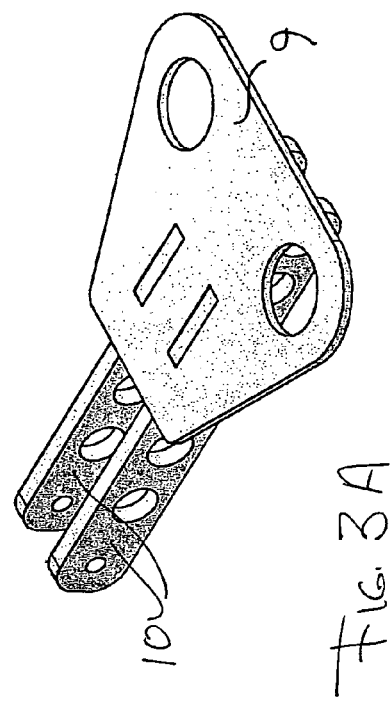
FIGS. 3A, 3B and 3C are, respectively, perspective, side elevational, and bottom views of the top plate subassembly used in the tool.
Figure 3C:
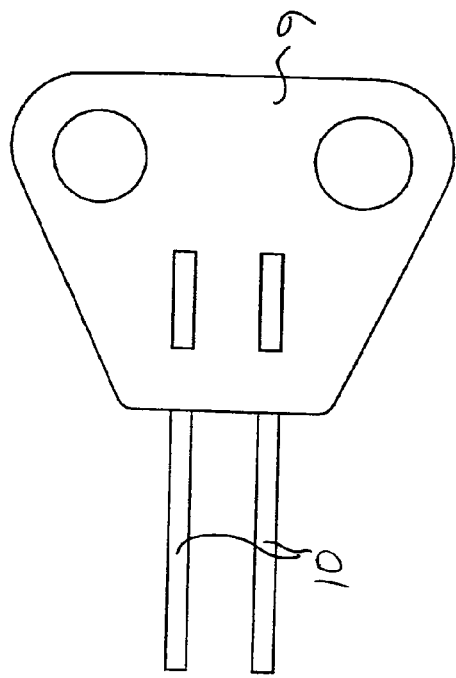
Figure 3B:
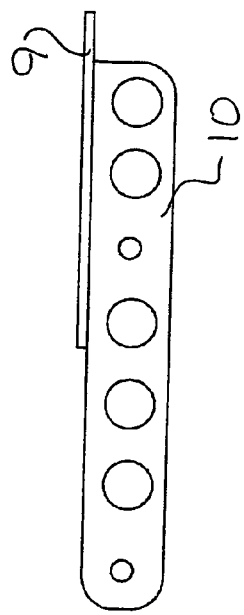

The tool of the invention is so designed that two of them would usually be used simultaneously, one being carried in each hand, using the hand-grip portion or frame handle 1, to thus permit easy and safe transport of a double load of pavers P. When loading the lifter (being in the configuration shown in FIGS. 1A-1D), the worker places the bottom carrying plate, or support plate 4 against and aligned beneath the bottom paver of a stack or beneath one of the more elevated pavers and the underlying adjacent paver. There are then two options for loading: one entails kicking the upstanding toe plate 17, provided at the base of the lifter, so as to force the carrying plate 4 to slide under the lowermost paver; the other entails placing the carrying plate 4 in proper position against the stack of pavers while holding the frame handle 1, and then effecting a quick upward and inward motion on the handle 1, again to cause the carrying plate 4 to slide under the stack; and obviously, both techniques can be used together. The back plate 5 functions as a backstop for the pavers, contributing to the ability of the lifter tool to carry the loaded stack in a balanced manner for safety, ease, and speed; it also ties together the parallel plates comprising the top frame.

After loading the pavers onto the carrying plate 4, the user grasps the clamping handle, generally designated by the numeral 15, and pivots it upwardly; the handle is padded for comfort. Elevating the handle 15 creates a clamping force upon the pavers P, generated between the carrying plate 4 and the top clamping plate 9, and allowing the user to lift the stack confidently. The clamping plate 9 is fitted with two rubber pads 16, which serve both to provide a better grip on the stack and also to protect the pavers against damage. As will be appreciated, clamping results from a mechanical action in which the force applied for elevation of the handle 15 is increased by the lever effect and acts through the head section 6, the link elements 8, and the parallel pivot arms 10 attached to the plate 9, with the link elements 8 being pivoted forwardly and the top plate 9 being pivoted downwardly on the connecting bolts 12 and 13, which are held in place by nuts (unnumbered).

After delivery of the load to the desired location, the lifter is set down on the carrying plate 4 and the handle 15 is released; being weighted, at 7, the handle 15 drops automatically and thereby instantly relieves the clamping force on the pavers. The frame handle 1 may then be grasped and used to rotate the lifter 180 degrees (more or less) in either direction about the vertical axis of the tool. The push-off plate 3 is so constructed that, during such manipulation, one or the other of its side edges (or both, if the tool is rotated reciprocally) will engage the pavers and urge them off the carrying plate 4. The finger hole 2, on the back of the post 18, can be used to facilitate withdrawal of the lifter from the deposited paver stack.

As will also be appreciated, the top frame, or carrier sub-assembly (shown in greatest detail in FIGS. 4A-4C) is slidably engaged upon the bottom frame sub-assembly, or support member (shown in greatest detail in FIGS. 5A-5E), with the upstanding post 18 of the latter engaged in the channel 25 between the opposite walls, or leg sections 19 of the former. The position of the pin 14, received in the common passage defined by one of the pairs of aligned holes 20, through the leg sections 19 of the top frame assembly, and the hole 21 at the top of the support member post 18, can readily be changed to raise and lower the position of the clamping plate 9 (such that a different pair of the holes 20 is brought into alignment with the post hole 21). This is of course enables configuration of the lifter to accommodate stacks of various heights, or consisting of various numbers or different sizes of pavers.

It should be noted that, in the present tool, both the frame handle 1 and also the (padded) handle section of the clamping handle 15 (which will often be used for carrying, rather than the frame handle) are in general vertical alignment over the support plate 4. Consequently, when lifting force is applied to either handle it lies effectively on the force vector produced by the stacked load, thereby maximizing balance and reducing any tendency for the load to fall off. This can be contrasted with the forwardly (and oppositely positioned) offset relationship that exists between the stacked load and the handle in the device of Andzaldua U.S. Pat. No. 7,163,246, and the laterally offset relationship that would exist in the carrier of Long U.S. Pat. No. 5,826,927, both of which produce substantially and undesirably unbalanced conditions.

It will be appreciated that many variations can be made in the form and construction of the present lifter tool without departing from the concept of the invention or the scope of the appended claims. For example, whereas in the illustrated embodiment pairs of parallel link elements and pivot arms are attached to the clamping handle and plate, a single element and arm, suitably constructed, can be substituted in each instance. Similarly, whereas pivot pins or bolts will normally be employed for attachment of the several relatively pivotable members, other conventional elements, such as studs and stub axles, can be utilized instead; also, any pin employed may be an element of a quick-release fastener device. And finally, it should be appreciated that many of the apertures provided in the illustrated components are non-functional and serve merely for reducing the weight and cost of the parts and the tool.

Thus, it can be seen that the present invention provides a tool that enables a user to simultaneously move stacks of pavers, or similar block-like objects, from place-to-place and to do so quickly, efficiently, and safely. The tool of the invention saves work; it enables the user to confidently transport an increased number of blocks, or to expend less effort than would otherwise be required; it reduces the amount of bending necessary, and thus the amount of physical stress; and it protects the user's hands and fingers.

Having thus described the invention, what is claimed is:

1. A tool for lifting and transporting a stack of objects, comprising:

a support member including a generally planar support plate and a post attached to said plate generally normal to a plane thereof, a portion of said support plate extending forwardly of said post and said post extending upwardly from said plate, in the disposition of normal use of said tool, and having at least one aperture there-through in an upper portion thereof;

a carrier assembly comprised of a pair of substantially identical, flat frame pieces affixed to one another in parallel, transversely spaced relationship so as to present a common profile, each of said frame pieces having an elongate, generally rectilinear upstanding leg section and a forwardly offset shoulder section at an upper end of said leg section, said leg sections of said frame pieces defining a channel therebetween and having a multiplicity of pairs of transversely aligned apertures therethrough at spaced locations along the lengths thereof, said post of said support member being received in said channel between said leg sections to slidably mount said carrier assembly on said support member, and said shoulder sections of said frame pieces having a pair of transversely aligned apertures therethrough, at a location spaced forwardly of the longitudinal axes of said leg sections thereof, and also having a pair of transversely aligned, laterally elongated openings in upper parts thereof to cooperatively provide a hand-grip portion on said carrier assembly;

disengageable fastening means having an element extending through said at least one aperture in said post and one of said pairs of apertures through said leg sections of said frame pieces so as to disengagably affix said carrier assembly at a selected height on said support member;

a handle member having a head section at one end and a handle section extending therefrom, a portion of said head section of said handle member being received in a space between said shoulder sections of said frame pieces with said handle section extending forwardly thereof, said head section having a plurality of apertures therethrough, one of said apertures of said head section, proximate said handle section, being aligned with said transversely aligned pair of apertures through said shoulder sections of said frame pieces to cooperatively define therewith a handle member mounting passage, and another of said apertures of said head section being provided in a bottom portion thereof;

a first pivot element disposed in said handle member mounting passage, rotatably mounting said handle member on said frame pieces with said bottom portion of said head section accessible for mechanical connection;

a clamping member including a clamping plate having a top side and a bottom side and forward and rearward edges, and a pair of pivot arms attached to said clamping plate and extending parallel to one another with rearward portions projecting beyond said rearward edge of said clamping plate, said pivot arms having at least one pair of transversely aligned apertures therethrough which are also aligned with one of said multiplicity of pairs of apertures in said leg sections of said frame pieces to define a pivot arm mounting passage;

a pair of substantially identical link elements having opposite ends and being disposed in parallel, transversely spaced relationship so as to present a common profile, said link elements having a plurality of pairs of transversely aligned apertures therethrough, one of said pairs of apertures being provided adjacent each of said opposite ends of said link elements, a first pair of said apertures at one of said ends of said link elements being aligned with said another aperture in said bottom portion of said handle member head section to cooperatively define therewith a link element mounting passage, and a second pair of said apertures at the other of said ends of said link elements being aligned with said at least one pair of transversely aligned apertures in said pivot arms to cooperatively define therewith a clamping member mounting passage;

second, third, and fourth pivot elements disposed, respectively in said pivot arm mounting passage, said link element mounting passage, and said clamping member mounting passage so as to enable movement of said clamping plate, toward and away from said support plate, in opposition to pivotal movement of said handle section of said handle member in upward and downward directions, respectively;

a kick plate disposed behind said post on said support plate and upstanding therefrom; and a push-off plate disposed in front of said post, and proximate thereto, on said support plate and upstanding therefrom, said push-off plate having marginal portions extending laterally beyond said post on both sides and providing contact elements for engaging, and urging forwardly, objects supported on said support plate upon rotation of said tool about a longitudinal axis of said tool.

2. A tool for lifting and transporting a stack of objects, comprising:

a support member including a generally planar support plate and a post attached to said plate generally normal to a plane thereof, a portion of said support plate extending forwardly of said post and said post extending upwardly from said plate, in the disposition of normal use of said tool, and having at least one aperture therethrough in an upper portion thereof;

a carrier assembly comprised of a pair of substantially identical, flat frame pieces affixed to one another in parallel, transversely spaced relationship so as to present a common profile, each of said frame pieces having an elongate, generally rectilinear upstanding leg section and a forwardly offset shoulder section at an upper end of said leg section, said leg sections of said frame pieces defining a channel therebetween and having a multiplicity of pairs of transversely aligned apertures therethrough at spaced locations along the lengths thereof, said post of said support member being received in said channel between said leg sections to slidably mount said carrier assembly on said support member, and said shoulder sections of said frame pieces having at least one pair of transversely aligned apertures therethrough at a location spaced forwardly from the longitudinal axes of said leg sections thereof;

disengageable fastening means having an element extending through said at least one aperture in said post and one of said pairs of apertures through said leg sections of said frame pieces so as to disengageably affix said carrier assembly at a selected height on said support member;

a handle member having a head section at one end and a handle section extending therefrom, a portion of said head section of said handle member being received in a space between said shoulder sections of said frame pieces with said handle section extending forwardly thereof, said head section having a plurality of apertures therethrough, one of said apertures of said head section, proximate said handle section, being aligned with said transversely aligned pair of apertures through said shoulder sections of said frame pieces to cooperatively define therewith a handle member mounting passage, and another of said apertures of said head section being provided in a bottom portion thereof;

a first pivot element disposed in said handle member mounting passage, rotatably mounting said handle member on said frame pieces with said bottom portion of said head section accessible for mechanical connection;

a clamping member including a clamping plate having a top side and a bottom side and forward and rearward edges, and at least one pivot arm attached to said clamping plate with a rearward portion projecting beyond said rearward edge of said clamping plate, said pivot arm having a plurality of apertures therethrough at spaced locations along the length thereof, one of said aligned apertures through said pivot arm being aligned with one of said multiplicity of pairs of apertures in said leg sections of said frame pieces to define a pivot arm mounting passage;

at least one link element having opposite ends, said link element having an aperture adjacent each of said opposite ends, a first aperture at one of said ends of said link element being aligned with said another aperture in said bottom portion of said handle member head section to cooperatively define therewith a link element mounting passage, and a second aperture at the other of said ends of said link element being aligned with another one of said apertures in said pivot arm to cooperatively define therewith a clamping member mounting passage; and second, third, and fourth pivot elements disposed, respectively, in said pivot arm mounting passage, said link element mounting passage, and said clamping member mounting passage so as to enable movement of said clamping plate, toward and away from said support plate, in opposition to pivotal movement of said handle section of said handle member in upward and downward directions, respectively.

3. The tool of claim 2 wherein said shoulder sections also having a pair of transversely aligned, laterally elongated openings in upper parts thereof to cooperatively provide a hand-grip portion on said carrier assembly.

4. The tool of claim 2 wherein said clamping member includes a pair of said pivot arms so attached to said clamping plate and extending parallel to one another and having a transversely aligned pair of apertures therethrough cooperatively defining said pivot arm mounting passage; and wherein said tool includes a pair of said link elements disposed in parallel, transversely spaced relationship so as to present a common profile, said link elements having a plurality of pairs of transversely aligned apertures therethrough, one of said of aperture pairs being provided adjacent each of said opposite ends of said link elements, a first pair of said apertures cooperatively defining said link element mounting passage and a second pair of said aperture cooperatively defining said clamping member mounting passage.

5. A tool for lifting and transporting a stack of objects, comprising:
   a support member including a generally planar support plate and a post attached to said plate generally normal to a plane thereof, a portion of said support plate extending forwardly of said post and said post extending upwardly from said plate, in the disposition of normal use of said tool;
   a carrier assembly comprised of a pair of substantially identical, flat frame pieces affixed to one another in parallel, transversely spaced relationship so as to present a common profile, each of said frame pieces having an elongate, generally rectilinear upstanding leg section and a forwardly offset shoulder section at an upper end of said leg section, said leg sections of said frame pieces defining a channel therebetween, said post of said support member being received in said channel between said leg sections to slidably mount said carrier assembly on said support member;
   disengageable fastening means constructed for disengageably affixing said carrier assembly at a selected height on said support member, said carrier assembly and said support member being constructed to cooperate with said fastening means for so affixing them;
   a handle member having a head section at one end and a handle section extending therefrom, a portion of said head section of said handle member being received in a space between said shoulder sections of said frame pieces with said handle section extending forwardly thereof;
   a clamping member including a clamping plate having a top side and a bottom side and forward and rearward edges;
   at least one link element having opposite ends;
   means for pivotably mounting said handle member on said frame pieces;
   means for pivotably attaching said clamping member to said leg sections of said frame member; and
   means for pivotably attaching one of opposite ends of said link element to a bottom portion of said head section of said handle member, and for pivotably attaching the other of said opposite ends of said link element to said clamping member, whereby said clampingplate moves toward and away from said support plate in opposition to pivotal movement of said handle section of said handle member in upward and downward directions, respectively, said tool additionally including a kick plate disposed behind said post on said support plate and upstanding therefrom.

6. A tool for lifting and transporting a stack of objects, comprising:
   a support member including a generally planar support plate and a post attached to said plate generally normal to a plane thereof, a portion of said support plate extending forwardly of said post and said post extending upwardly from said plate, in the disposition of normal use of said tool;
   a carrier assembly comprised of a pair of substantially identical, flat frame pieces affixed to one another in parallel, transversely spaced relationship so as to present a common profile, each of said frame pieces having an elongate, generally rectilinear upstanding leg section and a forwardly offset shoulder section at an upper end of said leg section, said leg sections of said frame pieces defining a channel therebetween, said post of said support member being received in said channel between said leg sections to slidably mount said carrier assembly on said support member;
   disengageable fastening means constructed for disengageably affixing said carrier assembly at a selected height on said support member, said carrier assembly and said support member being constructed to cooperate with said fastening means for so affixing them;
   a handle member having a head section at one end and a handle section extending therefrom, a portion of said head section of said handle member being received in a space between said shoulder sections of said frame pieces with said handle section extending forwardly thereof;
   a clamping member including a clamping plate having a top side and a bottom side and forward and rearward edges;
   at least one link element having opposite ends;
   means for pivotably mounting said handle member on said frame pieces;
   means for pivotably attaching said clamping member to said leg sections of said frame member; and
   means for pivotably attaching one of opposite ends of said link element to a bottom portion of said head section of said handle member, and for pivotably attaching the other of said opposite ends of said link element to said clamping member, whereby said clamping plate moves toward and away from said support plate in opposition to pivotal movement of said handle section of said handle member in upward and downward directions, respectively, said tool additionally including a push-off plate disposed in front of said post, and proximate thereto, on said support plate and upstanding therefrom, said push-off plate having marginal portions extending laterally beyond said post on both sides and providing contact elements for engaging and urging forwardly objects supported on said support plate upon rotation of said tool about a longitudinal axis of said tool.

7. A tool for lifting and transporting a stack of objects, comprising:
   a support member including a generally planar support plate and a post attached to said plate generally normal to a plane thereof, a portion of said support plate extending forwardly of said post and said post extending upwardly from said plate, in the disposition of normal use of said tool;
   a carrier assembly comprised of a pair of substantially identical, flat frame pieces affixed to one another in parallel, transversely spaced relationship so as to present a common profile, each of said frame pieces having an elongate, generally rectilinear upstanding leg section and a forwardly offset shoulder section at an upper end of said leg section, said leg sections of said frame pieces defining a channel therebetween, said post of said support member being received in said channel between said leg sections to slidably mount said carrier assembly on said support member;

disengageable fastening means constructed for disengageably affixing said carrier assembly at a selected height on said support member, said carrier assembly and said support member being constructed to cooperate with said fastening means for so affixing them;

a handle member having a head section at one end and a handle section extending therefrom, a portion of said head section of said handle member being received in a space between said shoulder sections of said frame pieces with said handle section extending forwardly thereof;

a clamping member including a clamping plate having a top side and a bottom side and forward and rearward edges;

at least one link element having opposite ends;

means for pivotably mounting said handle member on said frame pieces;

means for pivotably attaching said clamping member to said leg sections of said frame member; and means for pivotably attaching one of opposite ends of said link element to a bottom portion of said head section of said handle member, and for pivotably attaching the other of said opposite ends of said link element to said clamping member, whereby said clamping plate moves toward and away from said support plate in opposition to pivotal movement of said handle section of said handle member in upward and downward directions, respectively, said handle section of said handle member being disposed in generally vertical alignment over said support plate.

* * * * *